UNITED STATES PATENT OFFICE.

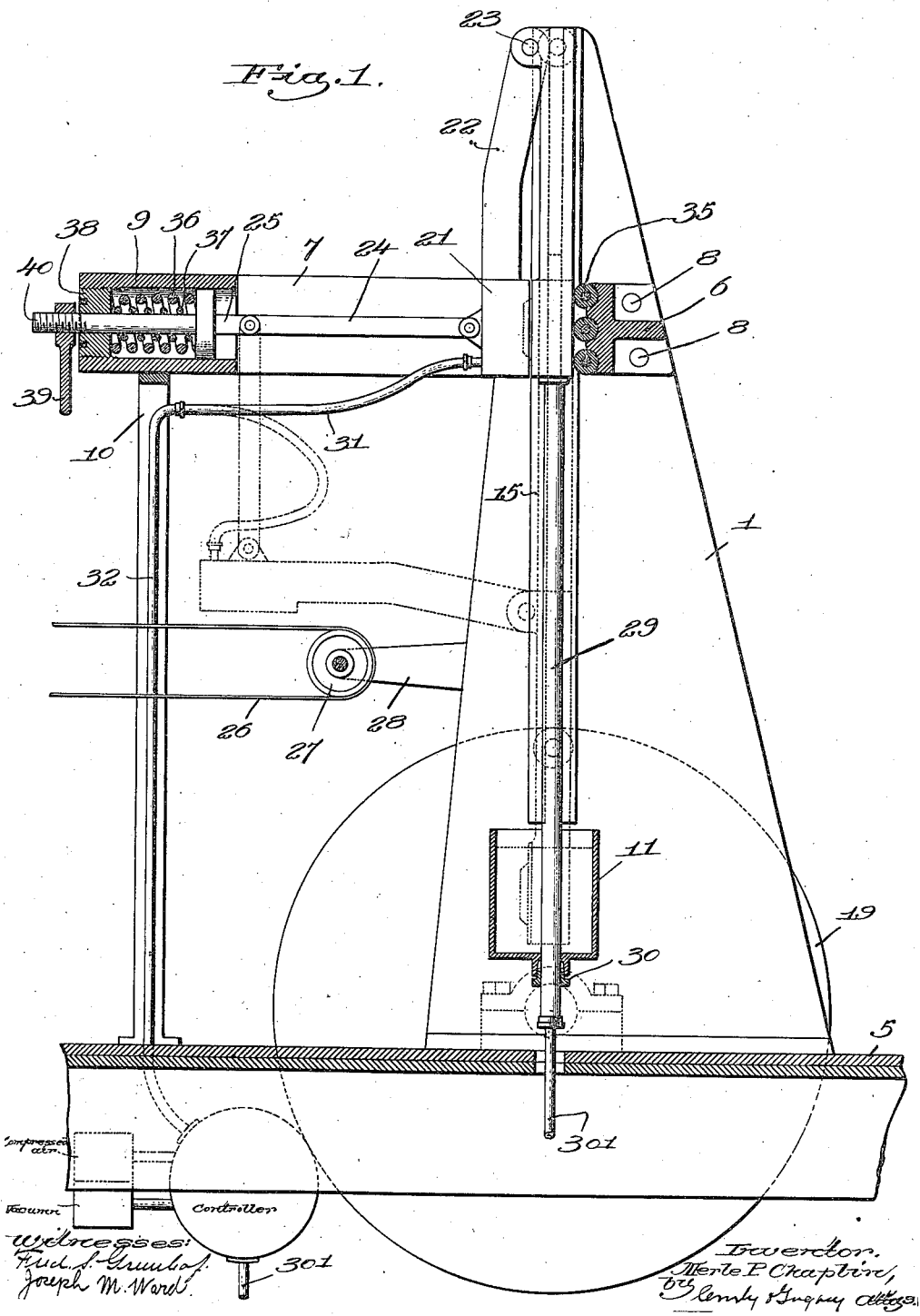

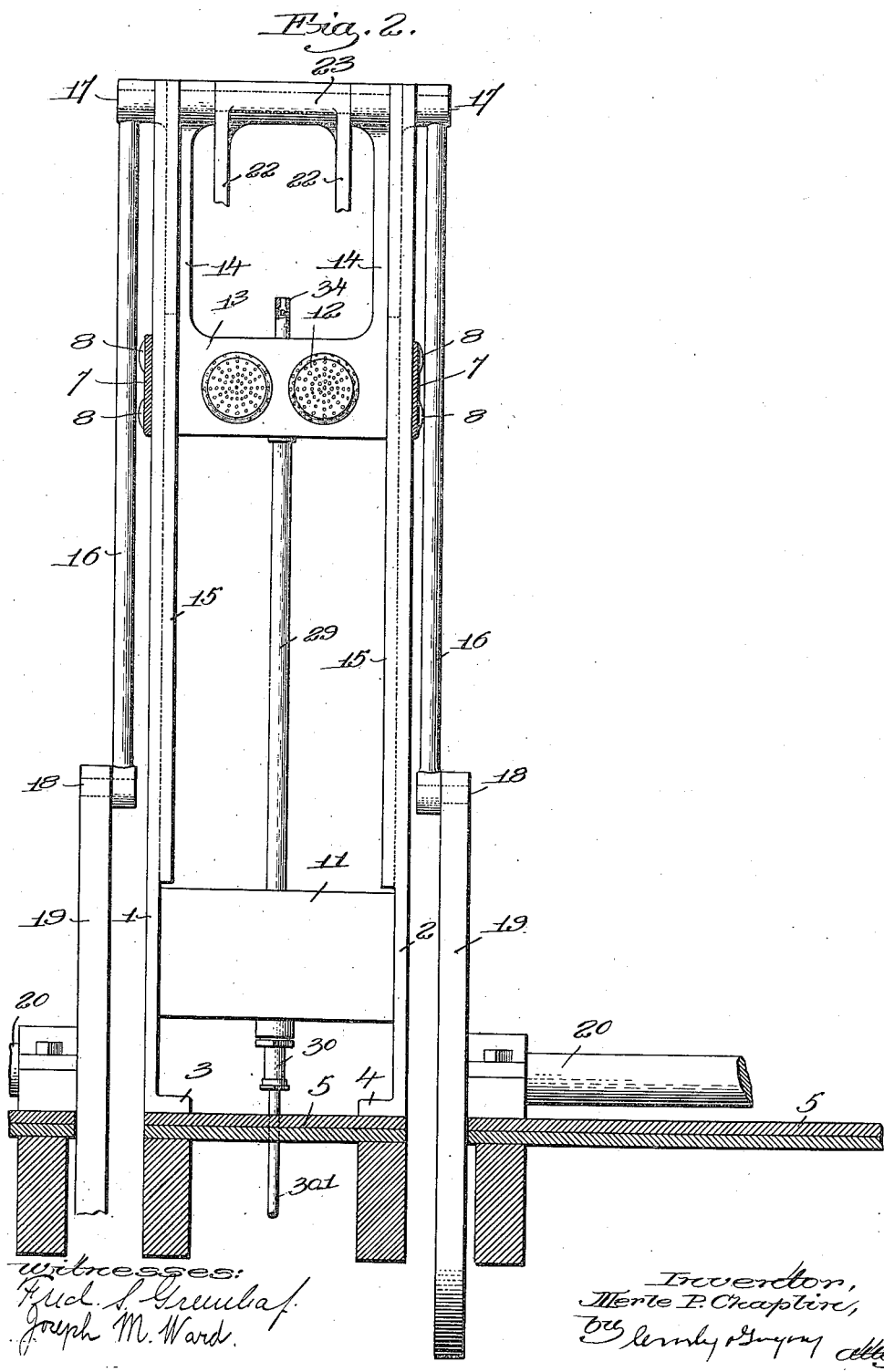

MERLE P. CHAPLIN, OF PORTLAND, MAINE, ASSIGNOR TO KEYES FIBRE COMPANY, OF WATERVILLE, MAINE, A CORPORATION OF MAINE.

APPARATUS FOR MAKING PULP ARTICLES.

1,158,634. Specification of Letters Patent. Patented Nov. 2, 1915.

Application filed June 4, 1910. Serial No. 564,917.

*To all whom it may concern:*

Be it known that I, MERLE P. CHAPLIN, a citizen of the United States, and resident of Portland, county of Cumberland, State of Maine, have invented an Improvement in Apparatus for Making Pulp Articles, of which the following description, in connection with the accompanying drawing, is a specification, like characters on the drawing representing like parts.

This invention relates to a machine or apparatus for molding articles from pulp of the general type made the subject of the patent to M. L. Keyes, No. 740,023, September 29, 1903. In machines of the type shown in the said Keyes patent two coöperating mold members are employed, and these mold members are carried upon a rotary mold carrier. Usually but one mold member passes down into the vat of pulp, while the other, being pivotally mounted, is guided from entering the pulp. In the subsequent stage in the travel of the molds they are compressed together, the molds are then separated, the molded article being blown from the member upon which it was formed onto the other member, and then in the further stage of the travel of the mold the completed article is lifted from the pivoted mold member by a sucker device and dropped upon a conveyer by which it is carried through the drying operation.

The present invention eliminates the sucker device by which the completed article is transferred from the mold member to the conveyer and enables the article to be deposited immediately from the mold member onto the conveyer.

The nature of the invention will appear more fully from the accompanying description and drawings and will be particularly pointed out in the claims.

The drawings represent a machine embodying the invention with the compressed air and vacuum apparatus shown diagrammatically.

In the drawings, Figure 1 is a side elevation, partially in cross section, of an apparatus embodying the present invention; Fig. 2 is an end elevation of the same apparatus with some of the parts broken away or removed.

The machine may be arranged to make one, or a plurality of articles, such, for example, as pie plates, at one time, the number varying according to the size of the article to be made and the economic size of the single machine. As illustrated, the machine is designed for making two pie plates at a time.

The machine as shown comprises an upright frame having the standards 1 and 2 flanged at the bottom at 3 and 4, respectively, and secured to the floor 5, or other suitable support. Near their upper ends these standards are secured together by a transverse brace 6.

A horizontally arranged yoke or frame extends out horizontally from the vertical frame and is disclosed as comprising two arms 7, bolted or secured respectively to the standards 1 and 2. The arms 7 are illustrated secured by bolts 8 to the standards 1 and 2 respectively. A head 9 unites the arms 7. This yoke or frame corresponds in general function to the yoke frame illustrated and described in the patent to M. L. Keyes, No. 908,577, granted January 5, 1909. The outer end of the yoke or frame is supported from the floor 5 by uprights, one of which is shown at 10.

A suitable vat 11 containing the supply of liquid pulp is mounted between the upright standards 1 and 2 upon or near the floor and is of sufficient size to receive the mold member, or group of mold members, upon which the layer of pulp is deposited, as hereinafter described. This vat is kept supplied in suitable manner with the liquid pulp.

The mold comprises two mold members supported by arms pivoted together to allow of the coöperative action of the two mold members. In the form illustrated, one mold member 12, which may be, as already explained, either for a single article or for a plurality of articles, two being illustrated, is formed on a hollow head 13 having the upwardly projecting arms 14. The head 13 slides vertically in ways 15 formed on the inner sides of the standards 1 and 2. When in its upper position it is in line with the yoke or frame 7 and 9, and when in its lower position the mold member is immersed in the liquid pulp in the vat 11. This movement up and down of the mold member 12 may be secured in any suitable manner, and is herein shown as secured by a pair of links 16 pivoted at their upper ends at 17 to the arms 14, and pivoted at their lower ends at 18 to a pair of crank wheels 19 driven by the shaft 20.

The coöperating mold members are formed on a similar hollow head 21 having the upwardly projecting arms 22 pivoted at 23 to the arms 14. The head 21 is connected by a link 24 with an abutment 25 carried in the head 9 of the yoke frame 7, and when the head 13 is at its upper position, as indicated in Fig. 1, the link 24 is horizontal. As the head 13 is moved downwardly the link 24 causes the head 21 to swing about the pivot 23 away from the head 13, and the parts are so proportioned that when the head 13 reaches its lower position in the pulp vat 11, the link 24 swings into a vertical position with the mold members, carried by the head 21, horizontal and facing downwardly, all as indicated in dotted lines in Fig. 1.

A suitable conveyer such as described in the patent to Keyes No. 740,023, above referred to, is indicated at 26 running over an idler 27 supported by brackets 28 from the standards 1 and 2 in such a position that plates or articles discharged from the mold members carried by the head 21, when in its position indicated in dotted lines in Fig. 1, will be discharged directly onto the conveyer.

The mold members are provided with perforated faces, described in the Keyes patents above referred to, so that air can be drawn and expelled therethrough.

A suitable system of apparatus for supplying compressed air and vacuum to the hollow mold members is provided, but as this system specifically considered forms no part of the present invention, it is chiefly illustrated in a diagrammatic manner.

The hollow head 13 has projecting downwardly therefrom a pipe 29 which extends through the pulp vat 11 and through a stuffing box 30 at the bottom thereof, and by means of this pipe compressed air or vacuum is connected to the hollow head 13 and, consequently, to the hollow mold members supported thereby, at the required times in the operation of forming the plates or other articles. This pipe 29 is shown as connected by a flexible pipe 301 to a controller device indicated diagrammatically in Fig. 1.

The hollow head 21 is connected by a flexible pipe 31 to a pipe 32 extending to the controller, and by means of which compressed air or vacuum may be admitted to the hollow head 21 and, consequently, to the hollow mold member carried thereby, at the desired times in the operation of forming the plate or other article. The hollow head 13 is also provided with a vertically, upwardly extending pipe 33 normally open to the atmosphere. An ordinary form of check valve 34 is provided in the upper end of the pipe which opens while suction is being applied to the head and closes when compressed air is applied to the head.

The mold members are compressed together when in their upper position within the yoke frame 9—7, in any suitable manner, and as an illustration of a means for securing the compression of the mold members a construction is shown similar to that in the aforesaid Keyes Patent No. 908,577.

The brace or abutment 6 carries anti-friction rolls 35 against which the back of the head 13 rests when in its upper position. The abutment 25 is pressed yieldingly and adjustably with tremendous force in the direction of the anti-friction rolls 35.

The means for creating the pressure on the abutment 25 and adjusting this pressure may be of any desired form and is herein illustrated as similar to the means in the aforesaid Keyes Patent No. 908,577, comprising the concentrically-arranged powerful coil springs 36 and 37 extending between the abutment 25 and the cap 38 screwed into the head 9, together with the adjustable hand nut 39 screw-threaded onto the shaft 40 extending from the abutment 25. It will thus be seen that when the mold members arrive near the upper limit of their movement the link 24 begins to assume a horizontal position and gradually, with great force, compresses the mold members together between the anti-friction rolls 35 and the abutment 25.

The operation of the entire machine will now be apparent. With the parts as indicated in full lines, Fig. 1, and with the pulp vat supplied with liquid pulp, the crank wheels 19 begin to revolve; the head 13 is carried downwardly into the pulp vat 11 and vacuum is connected to the head, sucking a thin layer of pulp onto the face of the mold members carried thereby. Upon continued revolution of the crank wheels the head 13 rises, the vacuum being continued, thus, owing to the open tube 33, sucking water out of the pulp. As the head 13 nears its upper position the head 21 swings back into coöperation with it and the mold members are forced together with great pressure in the yoke frame. Upon reaching its uppermost position the tube 33 is closed by the check valve 34 upon disconnecting the vacuum and connecting the compressed air to the head 13. Compressed air is now connected to the head 13 and vacuum to the head 21 so that upon the commencement of the descent of the mold members, upon the continued rotation of the crank wheels, the plate formed and pressed is blown from the head 13 onto the head 21 and held there by suction. As the operation of the machine continues the head 13 proceeds again into the pulp vat while the head 21 swings down into the position shown in dotted lines in Fig. 1, and immediately upon reaching that position the vacuum is disconnected therefrom and compressed air connected, blowing the plate off upon the conveyer 26 by which it is carried through the drying operation. The cycle of operation then continues, causing a continuous stream of plates to fall upon the conveyer 26.

Having fully described my invention what I claim as new and desire to secure by Letters Patent is:

1. In an apparatus of the class described a mold comprising two members, a pulp vat, a compressing device, an endless conveyer, arms supporting the mold members and pivoted together to allow the coöperative action of the said members, means to give a bodily reciprocatory movement to said pivoted members, means to guide the one member in its reciprocations between positions in the pulp vat and in the compressing device, and means to guide the other member in its reciprocations between positions over the conveyer and in the compressing device.

2. In an apparatus of the class described a mold comprising two members, a pulp vat, a compressing device, an endless conveyer, and means for operating and moving said mold members to take pulp from the pulp vat, compress it in the compressing device and discharge the completed article directly on the conveyer.

3. In an apparatus of the class described means for forming an article directly from liquid pulp including a pair of mold members, an endless conveyer, and means for discharging the formed article directly from one of said mold members onto said conveyer.

4. In an apparatus of the class described a pulp vat, an endless conveyer extending adjacent the vat, horizontally arranged fixed and movable abutments located respectively above the vat and the conveyer, a mold member, and means for reciprocating it in a vertical path between the pulp vat and the said fixed abutment, anti-friction devices between said mold member and said fixed abutment, a coöperating mold member pivoted to said first mold member, a link pivoted to the movable abutment and to the coöperating mold member, and means for exerting pressure upon the movable abutment when the said link and mold member are in line between the abutments.

In testimony whereof, I have signed my name to this specification, in the presence of two subscribing witnesses.

MERLE P. CHAPLIN.

Witnesses:
 FRED L. PENNELL,
 LEON V. WALKER.